(12) United States Patent
Kim et al.

(10) Patent No.: US 10,033,545 B2
(45) Date of Patent: *Jul. 24, 2018

(54) METHOD AND APPARATUS FOR PROVIDING GUI

(71) Applicant: SAMSUNG ELECTRONICS CO., LTD., Suwon-si (KR)

(72) Inventors: Deok-ho Kim, Seoul (KR); Ki-ho Kim, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 301 days.

This patent is subject to a terminal disclaimer.

(21) Appl. No.: 14/707,062

(22) Filed: May 8, 2015

(65) Prior Publication Data
US 2015/0264428 A1 Sep. 17, 2015

Related U.S. Application Data (63) Continuation of application No. 12/639,694, filed on Dec. 16, 2009, now Pat. No. 9,143,343.

(30) Foreign Application Priority Data

Dec. 24, 2008 (KR) .................. 10-2008-0133595

(51) Int. Cl.
*H04L 12/28* (2006.01)
*H04N 5/445* (2011.01)
(Continued)

(52) U.S. Cl.
CPC ........ *H04L 12/2827* (2013.01); *H04L 12/282* (2013.01); *H04L 12/2805* (2013.01);
(Continued)

(58) Field of Classification Search
CPC .. H04N 21/436; H04N 21/4363; H04N 21/41; H04L 12/28
See application file for complete search history.

(56) References Cited

U.S. PATENT DOCUMENTS 5,956,025 A 9/1999 Goulden et al.
6,211,856 B1 4/2001 Choi et al.
(Continued)

FOREIGN PATENT DOCUMENTS

EP 1 562 328 A2 8/2005
KR 2002-0008034 A 1/2002
(Continued)

OTHER PUBLICATIONS

Communication dated Jul. 31, 2015, issued by the Korean Intellectual Property Office in counterpart Korean Application No. 10-2008-0133595.
(Continued)

*Primary Examiner* — David Choi
(74) *Attorney, Agent, or Firm* — Sughrue Mion, PLLC (57) ABSTRACT

A GUI providing method and a GUI providing apparatus are provided. According to the GUI providing method, a GUI from among GUIs for an external apparatus connected to a video apparatus is determined and displayed. Accordingly, if there are many GUIs for an apparatus, a GUI most suitable for the current circumstance is automatically determined and provided to a user.

9 Claims, 12 Drawing Sheets

(51) Int. Cl.

| | | |
|---|---|---|
| *H04N 21/41* | (2011.01) | |
| *H04N 21/485* | (2011.01) | |
| *H04N 21/488* | (2011.01) | |
| *H04N 21/436* | (2011.01) | |
| *H04N 21/4363* | (2011.01) | |
| *H04N 21/482* | (2011.01) | |
| *H04N 21/472* | (2011.01) | |

(52) U.S. Cl.
CPC ..... *H04L 12/2809* (2013.01); *H04N 5/44513* (2013.01); *H04N 21/4104* (2013.01); *H04N 21/4131* (2013.01); *H04N 21/4363* (2013.01); *H04N 21/43615* (2013.01); *H04N 21/43635* (2013.01); *H04N 21/43637* (2013.01); *H04N 21/482* (2013.01); *H04N 21/485* (2013.01); *H04N 21/488* (2013.01); *H04L 2012/285* (2013.01); *H04L 2012/2841* (2013.01); *H04L 2012/2849* (2013.01); *H04N 21/4113* (2013.01); *H04N 21/4126* (2013.01); *H04N 21/4135* (2013.01); *H04N 21/47217* (2013.01)

(56) References Cited

U.S. PATENT DOCUMENTS

| | | | |
|---|---|---|---|
| 6,219,032 B1 | 4/2001 | Rosenberg et al. | |
| 6,338,405 B1* | 1/2002 | Yoerg | G11B 23/0305 |
| | | | 206/232 |
| 6,362,842 B1 | 3/2002 | Tahara et al. | |
| 6,546,419 B1 | 4/2003 | Humpleman et al. | |
| 6,988,247 B2 | 1/2006 | Janevski | |
| 7,173,730 B1 | 2/2007 | Suzuki et al. | |
| 7,483,038 B2 | 1/2009 | Oh | |
| 7,522,087 B2 | 4/2009 | Shibamiya et al. | |
| 7,523,407 B2 | 4/2009 | Ito | |
| 7,581,182 B1 | 8/2009 | Herz | |
| 7,581,186 B2 | 8/2009 | Dowdy et al. | |
| 7,821,377 B2* | 10/2010 | Arai | H04N 5/4403 |
| | | | 340/12.53 |
| 7,823,083 B2 | 10/2010 | Rohrabaugh et al. | |
| 7,831,926 B2 | 11/2010 | Rohrabaugh et al. | |
| 7,844,889 B2 | 11/2010 | Rohrabaugh et al. | |
| 7,992,187 B2* | 8/2011 | Chiao | H04N 7/163 |
| | | | 348/734 |
| 8,054,294 B2 | 11/2011 | Sakai et al. | |
| 8,179,404 B2* | 5/2012 | Nagatomo | G08C 23/04 |
| | | | 341/176 |
| 8,209,623 B2* | 6/2012 | Barletta | G06F 3/04883 |
| | | | 715/776 |
| 8,336,773 B2 | 12/2012 | Trimper et al. | |
| 8,341,536 B2* | 12/2012 | Mendel | G06F 8/31 |
| | | | 715/762 |
| 8,478,103 B2 | 7/2013 | Sugiyama | |
| 2001/0015719 A1 | 8/2001 | Van Ee et al. | |
| 2002/0044764 A1* | 4/2002 | Akamatsu | H04L 12/40117 |
| | | | 386/291 |
| 2002/0171762 A1 | 11/2002 | Maxson et al. | |
| 2003/0141987 A1 | 7/2003 | Hayes | |
| 2003/0231197 A1 | 12/2003 | Janevski | |
| 2004/0261010 A1 | 12/2004 | Matsuishi | |
| 2005/0223332 A1 | 10/2005 | Ito | |
| 2005/0223339 A1 | 10/2005 | Lee | |
| 2006/0082652 A1 | 4/2006 | Sugiyama | |
| 2006/0101338 A1* | 5/2006 | Kates | H04N 5/4403 |
| | | | 715/716 |
| 2006/0109240 A1 | 5/2006 | Fu et al. | |
| 2006/0152528 A1 | 7/2006 | Oh | |
| 2006/0282793 A1 | 12/2006 | Stephens et al. | |
| 2007/0124424 A1 | 5/2007 | Matsuda | |
| 2007/0149286 A1 | 6/2007 | Bemmel | |
| 2007/0168413 A1* | 7/2007 | Barletta | G06F 3/04883 |
| | | | 709/203 |
| 2007/0188658 A1* | 8/2007 | Kado | H04N 5/44513 |
| | | | 348/558 |
| 2007/0229465 A1 | 10/2007 | Sakai et al. | |
| 2007/0296552 A1 | 12/2007 | Huang et al. | |
| 2008/0120635 A1 | 5/2008 | Trimper et al. | |
| 2008/0209323 A1 | 8/2008 | Park | |
| 2008/0240283 A1 | 10/2008 | Iwamura | |
| 2008/0282172 A1 | 11/2008 | Bayang et al. | |
| 2008/0297656 A1* | 12/2008 | Saito | H04N 5/44 |
| | | | 348/554 |
| 2009/0058708 A1* | 3/2009 | Park | G08C 19/28 |
| | | | 341/176 |
| 2009/0058885 A1 | 3/2009 | Park et al. | |
| 2009/0136209 A1 | 5/2009 | Nonaka et al. | |
| 2009/0138579 A1 | 5/2009 | Jung | |
| 2009/0146962 A1 | 6/2009 | Ahonen et al. | |
| 2009/0174653 A1 | 7/2009 | Shin et al. | |
| 2009/0184926 A1 | 7/2009 | Kates | |
| 2009/0190042 A1* | 7/2009 | Kimura | H04N 5/4403 |
| | | | 348/734 |
| 2009/0225091 A1 | 9/2009 | Noh et al. | |
| 2009/0248909 A1* | 10/2009 | Hironaka | G09G 5/006 |
| | | | 710/18 |
| 2010/0013995 A1 | 1/2010 | Um | |
| 2010/0110032 A1 | 5/2010 | Kim et al. | |
| 2010/0162118 A1 | 6/2010 | Kim et al. | |
| 2011/0055736 A1 | 3/2011 | Kang et al. | |
| 2011/0161814 A1 | 6/2011 | Kim et al. | |
| 2011/0161869 A1 | 6/2011 | Yoo et al. | |
| 2015/0264428 A1* | 9/2015 | Kim | H04L 12/2809 |
| | | | 725/80 |

FOREIGN PATENT DOCUMENTS

| | | |
|---|---|---|
| KR | 10-2005-0013578 A | 2/2005 |
| KR | 10-2006-0053257 A | 5/2006 |
| KR | 10-2008-0056058 A | 6/2008 |

OTHER PUBLICATIONS

"A User Interface Specification for Home Networks Using Web-based Protocols; CEA-2027-A" EIA/TIA Standards, Telecommunications Industry Associations, Mar. 2006; pp. 1-48.

Search Report dated Apr. 12, 2010 issued by the European Patent Office in European Application No. 09180555.6.

* cited by examiner

| | TV | REMOTE | MY DEVICES | INFOLINK | SETTING | YOU'RE WATCHING Top Gear | CLOCK | WIFI Indicator | BATTERY Indictaor |

My Devices

| TYPE | DEVICE | | | INPUT TYPE |
|---|---|---|---|---|
| ICON | BD/DVD Player | | | HDMI-1 |
| ICON | PC | | | HDMI-2 |
| ICON | Mobile Phone | | | WiFi |
| ICON | MP3 | | | WiFi |

ADD NEW DEVICE    REMOVE DEVICE

METHOD AND APPARATUS FOR PROVIDING GUI

CROSS-REFERENCE TO RELATED APPLICATIONS

This application is a continuation of U.S. application Ser. No. 12/639,694 filed on Dec. 16, 2009, which claims priority from Korean Patent Application No. 10-2008-0133595, filed on Dec. 24, 2008, in the Korean Intellectual Property Office, the disclosures of which are incorporated herein by reference in their entirety.

BACKGROUND OF THE INVENTION

1. Field of the Invention

Apparatuses and methods consistent with the present invention relate to providing a Graphical User Interface (GUI), and more particularly, to a method and apparatus for providing a GUI which is used for inputting a user's command.

2. Description of the Related Art

Various kinds of home appliances are connected centering on a digital television (DTV) to form a home network, and the scale of home network is getting bigger and there is almost no limitation to home appliances which can be integrated into the home network. Accordingly, it became possible to connect all apparatus a user has via a single network.

With the advent of a home network, an apparatus needs to be operated not only on its own but also in connection with other apparatuses. As the number of functions an apparatus performs increases, the number of GUI also increases.

As the number of GUI increases due to the increase in the number of functions an apparatus performs, a user has troubles in selecting a GUI since it has become more difficult and complicated to manipulate such an apparatus even for a user who is accustomed to an advanced apparatus.

SUMMARY OF THE INVENTION

Exemplary embodiments of the present invention address at least the above problems and/or disadvantages and other disadvantages not described above. Also, the present invention is not required to overcome the disadvantages described above, and an exemplary embodiment of the present invention may not overcome any of the problems described above.

Exemplary embodiments of the present invention provide a method and an apparatus for selecting a GUI and providing it to a user when there are several GUIs in an apparatus which is communicably connected or is capable of sending a command remotely.

A method for providing a GUI, according to the exemplary embodiment of the present invention comprises receiving selection of an external apparatus from among external apparatuses connected to a video apparatus determining a Graphical User Interface (GUI) from among GUIs for the selected external apparatus, and displaying the determined GUI.

The method for providing a GUI may further comprise analyzing connection method between the video apparatus and the selected external apparatus and the determining may determine a GUI from among GUIs for the selected external apparatus based on the connection method.

The determining may determine a first GUI from among GUIs for the selected external apparatus if the connection method is a first connection method, and determine a second GUI from among GUIs for the selected external apparatus if the connection method is a second connection method.

The analyzing may analyze the connection method based on information received from the video apparatus.

The selected external apparatus may be operated in a different operation mode depending on the connection method with the video apparatus.

The method for providing a GUI as claimed may further comprise analyzing whether an event is occurred in the selected external apparatus and the determining may determine a GUI from among GUIs for the selected external apparatus based on information regarding whether the event is occurred.

The method for providing a GUI may further comprise displaying a second GUI for the selected external apparatus if an event is occurred in the selected external apparatus while a first GUI for the selected external apparatus is displayed.

The method for providing a GUI may further comprise displaying GUIs for the selected external apparatus, and the determining may determine a GUI selected by a user from among GUIs for the selected external apparatus as a GUI to be displayed in the displaying.

The method for providing a GUI may further comprise analyzing a recent operation mode of the selected external apparatus and one of the most frequently used operation mode, and the determining may determine a GUI used in a mode analyzed in the analyzing from among GUIs for the selected external apparatus as a GUI to be displayed in the displaying.

The receiving selection, the determining, and the displaying may be performed by an apparatus which receives a user's command for the video apparatus and external apparatuses connected to the video apparatus.

The external apparatus may be operated in a mode from among a plurality of operation modes, and have a different GUI for each of the plurality of operation mode.

The method for providing a GUI may further comprise transferring the command to the video apparatus if a command for the video apparatus is received and transferring the command to the selected external apparatus via the video apparatus if a command for the selected external apparatus is received.

The GUIs for the external apparatuses may be received 1) directly from the external apparatuses, 2) from the external apparatuses via the video apparatus, or 3) via an external network, and be retained.

The method for providing a GUI may further comprise receiving contents from the selected external apparatus via the video apparatus and generating the received contents.

The GUI may include at least one of 1) a menu screen for the external apparatus, 2) a list of contents stored in the external apparatus, 3) a file browser for browsing files stored in the external apparatus, and 4) a graphic controller for the external apparatus.

A method for providing a GUI, according to the exemplary embodiment of the present invention, comprises receiving selection of an external apparatus from among the video apparatus and external apparatuses connected to the video apparatus, determining a GUI from among GUIs for the selected apparatus, and displaying the determined GUI.

A GUI providing apparatus, according to the exemplary embodiment of the present invention, comprises a GUI generating unit for generating a GUI to be displayed on the display and a control unit which determines a GUI from among GUIs for the selected external apparatus if a user selects an external apparatus from among external apparatuses connected to the video apparatus, and controls the GUI generating unit so that the determined GUI is displayed on the display.

The control unit may analyze connection method between the video apparatus and the selected external apparatus, and determine a GUI from among GUIs for the selected external apparatus based on the connection method.

The control unit may analyze whether an event is occurred in the selected external apparatus, and determine a GUI from among GUIs for the selected external apparatus based on information regarding whether the event is occurred.

The GUI providing apparatus, may further comprise a communication unit which is communicably connected to the video apparatus, and the control unit may 1) transfer the command to the video apparatus via the communication unit if a command for the video apparatus is received, and 2) transfer the command to the selected external apparatus via the communication unit and the video apparatus if a command for the selected external apparatus is received.

The GUI providing apparatus may further comprise a storage unit for storing GUIs for the external apparatuses, and the control unit may control the GUI generating unit so that the determined GUI from among GUIs stored in the storage unit is displayed on the display.

At least one external apparatus from among the external apparatuses may be directly connected to the GUI providing apparatus.

The GUI may include at least one of 1) a menu screen for the external apparatus, 2) a list of contents stored in the external apparatus, 3) a file browser for browsing files stored in the external apparatus, and 4) a graphic controller for the external apparatus.

A GUI providing apparatus, according to the exemplary embodiment of the present invention, comprises a GUI generating unit for generating a GUI to be displayed on the display and a control unit which determines a GUI from among GUIs for the selected external apparatus if a user selects one of a video apparatus and external apparatuses connected to the video apparatus, and controls the GUI generating unit so that the determined GUI is displayed on the display.

As described above, exemplary embodiments of the present invention determines a GUI most suitable for the current circumstance when there are several GUIs used in an apparatus and provides the determined GUI to a user. Accordingly, a user can manipulate the GUI fast and more conveniently.

BRIEF DESCRIPTION OF THE DRAWINGS

The above and/or other aspects of the present invention will be more apparent by describing certain exemplary embodiments of the present invention with reference to the accompanying drawings, in which.

DETAILED DESCRIPTION OF EXEMPLARY EMBODIMENTS OF THE INVENTION

Certain exemplary embodiments of the present invention will now be described in greater detail with reference to the accompanying drawings.

In the following description, the same drawing reference numerals are used for the same elements even in different drawings. The matters defined in the description, such as detailed construction and elements, are provided to assist in a comprehensive understanding of the invention. Thus, it is apparent that the present invention can be carried out without those specifically defined matters. Also, well-known functions or constructions are not described in detail since they would obscure the invention with unnecessary detail.

Figure 1:
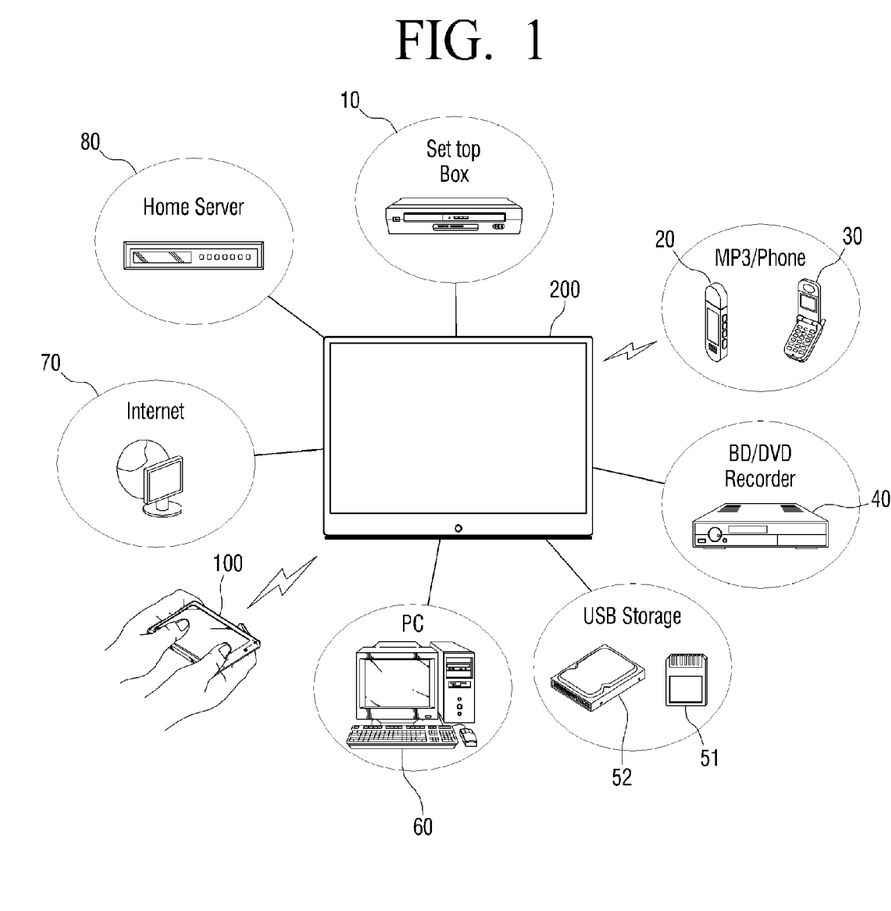
FIG. 1 is a schematic view illustrating a system to which the present invention is applicable.

FIG. 1 is a schematic view illustrating a system to which the present invention is applicable. As illustrated in FIG. 1, the present system comprises a DTV 200, external apparatuses 10 to 80, and a remote controller 100.

The external apparatuses 10 to 80 are communicably connected to the DTV 200. More specifically, a set top box (STB) 10, a BD/DVD recorder 40, a PC 60, the Internet 70, and a home server 80 are connected to the DTV 200 with wires, an MP3 player 20 and a mobile phone 30 are connected to the DTV 200 wirelessly, and a USB storages 51 and 53 are connected to the DTV 200 by physical contact, i.e., are installed or inserted in the DTV 200. Strictly speaking, the Internet 70 is not an external apparatus of the DTV 200, but an external network. However, the Internet 70 will be treated as an external apparatus for convenience of explanation.

The above description of connection is only an example, and the present invention can be applied when a part of or an entire apparatus is connected to the DTV 200 in other ways.

Likewise, there is no limitation to the connection between an external apparatus and the DTV 200. For instance, in the case of wired connection, a STB 40 can be connected to the DTV 200, whether by component connection or by HDMI connection. The PC 60 can also be connected to the DTV 200, whether by HDMI or by LAN.

In the case of wireless connection, the mobile phone 30 can be connected to the DTV 200, whether by a Bluetooth connection or by a WiFi connection.

The remote controller 100 is the size which a user can hold and manipulate in a hand, and a user can input a command for the DTV 200 and external apparatuses 10 to 80 using the remote controller 100.

In order to input the command, the remote controller 100 provides GUIs for the DTV 200 and external apparatuses 10 to 80. The GUI includes a menu screen for the related apparatus, a content list stored in the related apparatus, a file browser browsing files stored in the related apparatus, and a graphical interface for the related apparatuses (ex., graphical interfaces for the remote control, keyboard, key pad, touch pad, and other screens which provide interfaces a user can manipulate).

The remote controller 100 is connected to the DTV 200 wirelessly. The command for the DTV 200 received via the remote controller 100 is transmitted to the DTV 200 wirelessly.

The command for external apparatuses 10 to 80 received via the remote controller 100 is also transmitted to the DTV 200. The DTV 200 transmits the command received from the remote controller 100 to the related external apparatus.

The remote controller 100 may receive contents from the DTV 200. The contents the remote controller 100 receives may be contents received, reproduced, or stored in the DTV 200, or may be contents received, reproduced, or stored in external apparatuses 10 to 80.

Since the remote controller 100 has a display, it is possible to reproduce the received contents and display it on the display.

Figure 2:
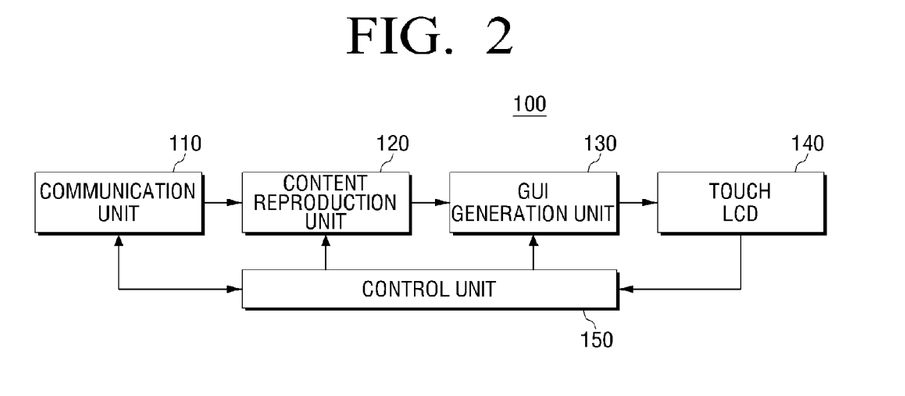
FIG. 2 is a detailed block diagram illustrating a remote controller according to an exemplary embodiment of the present invention.

The remote controller 100 will be explained in greater detail with reference to FIG. 2. FIG. 2 is a detailed block diagram illustrating a remote controller according to an exemplary embodiment of the present invention.

As illustrated in FIG. 2, the remoter controller 100, according to the exemplary embodiment of the present invention, comprises a communication unit 110, a content reproduction unit 120, a GUI generation unit 130, a touch LCD 140, and a control unit 150.

The communication unit 110 is connected the DTV 200 wirelessly.

There is no limitation to wireless connection between the communication unit 110 and the DTV 200. The communication unit 110 transmits a user's command received via the remote controller 100 to the DTV 200, and receives contents from the DTV 200.

The content reproduction unit 120 generates contents received via the communication unit 110. In addition, the content reproduction unit 120 generates contents stored in a recording medium (not shown) in the remoter controller 100.

The GUI generation unit 130 generates a GUI under the control of the control unit 150, and adds the generated GUI to an image output from the content reproduction unit 120. The touch LCD 140 is sort of a display on which a GUI-added image output from the GUI generation unit 130 is displayed.

If there is no image output from the content reproduction unit 120 or if the GUI generated from the GUI generation unit 130 covers an entire image output from the content reproduction unit 120, only GUI is displayed on the touch LCD 140.

The GUI generated from the GUI generation unit 130 includes GUIs for the DTV 200 and external apparatuses 10 to 80 in addition to a GUI for the remote controller 100.

For this, the GUI generation unit 130 stores GUIs for the remote controller 100, the DTV 200 and the external apparatuses 10 to 80. Of course, those GUIs may be stored in a separate memory (not shown).

The GUI generation unit 130 may receive GUI for the DTV 200 directly from the DTV 200 or from the Internet 70 and store it.

The GUI generation unit 130 may receive GUIs for the external apparatuses 10 to 80 directly from the external apparatuses 10 to 80, from the external apparatuses 10 to 80 via the DTV 200, or from the Internet 70 and store them.

The touch LCD 140 receives a user's touch input or dragging input. A user may input a command for the remote controller 100, the DTV 200, and external apparatuses 10 to 80 via the touch LCD 140. The command can be input using GUIs provided via the touch LCD 140.

The control unit 150 controls the communication unit 110, the content reproduction unit 120, the GUI generation unit 130 and the touch LCD 140 according to a user's command received via the touch LCD 140 or other manipulation means (ex. physical button: not shown).

More specifically, if the command is for the remote controller 100, the control unit 150 controls the content reproduction unit 120. If the command is for the DTV 200 or the external apparatuses 10 to 80, the control unit 150 transmits it the DTV 200 via the communication unit 110.

Figure 3:
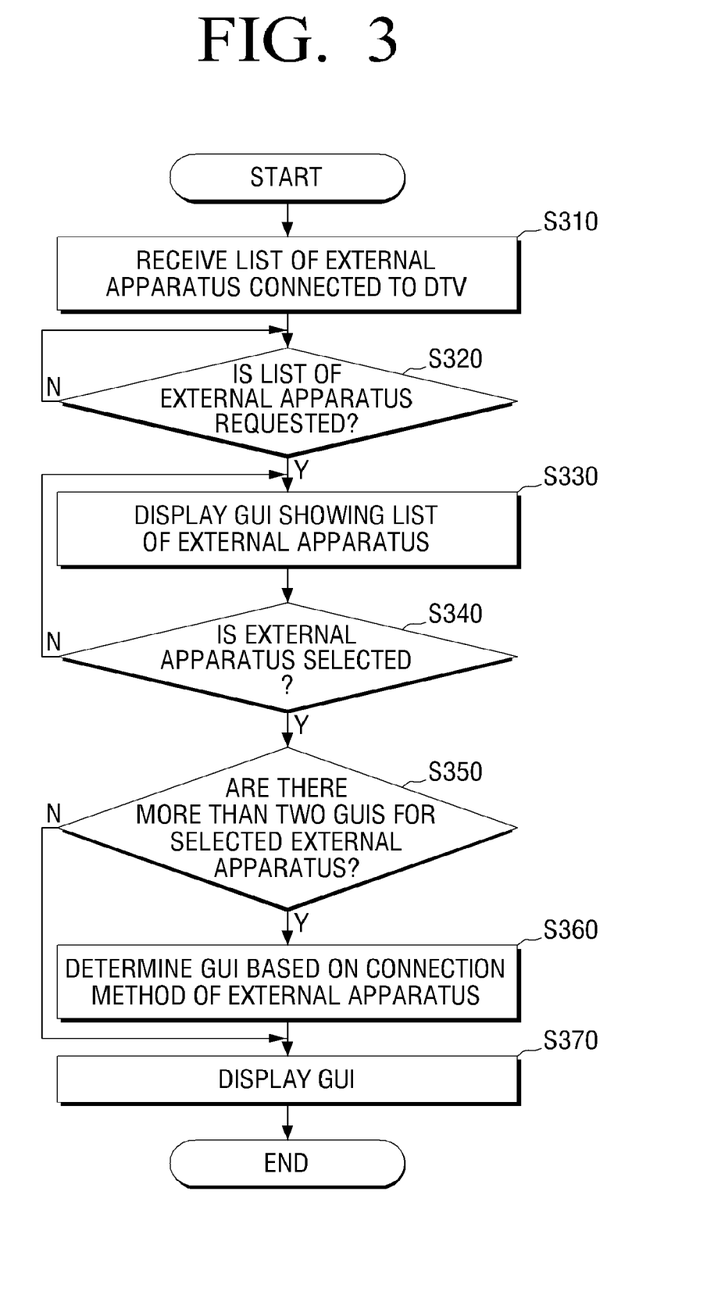
FIG. 3 is a flow chart provided to explain how to provide a GUI according to the exemplary embodiment of the present invention.

The control unit 150 controls generating of a GUI by the GUI generation unit 130, and this will be explained in detail with reference to FIG. 3. FIG. 3 is a flow chart provided to explain how to provide a GUI according to the exemplary embodiment of the present invention As illustrated in FIG. 3, the control unit 150 receives a list of external apparatuses from the DTV 200 via the communication unit 110 (S310). The list of external apparatuses is a list of apparatuses connected to the DTV 200, and the list includes information regarding those apparatuses. The information regarding the external apparatuses includes information regarding connection method between the external apparatuses and the DTV 200.

If a user requests a list of external apparatuses via the LCD 140 (S320-Y), the control unit 150 controls the GUI generation unit 130 so that a GUI showing a list of external apparatuses can be displayed on the touch LCD 140 (S330).

Figure 4:
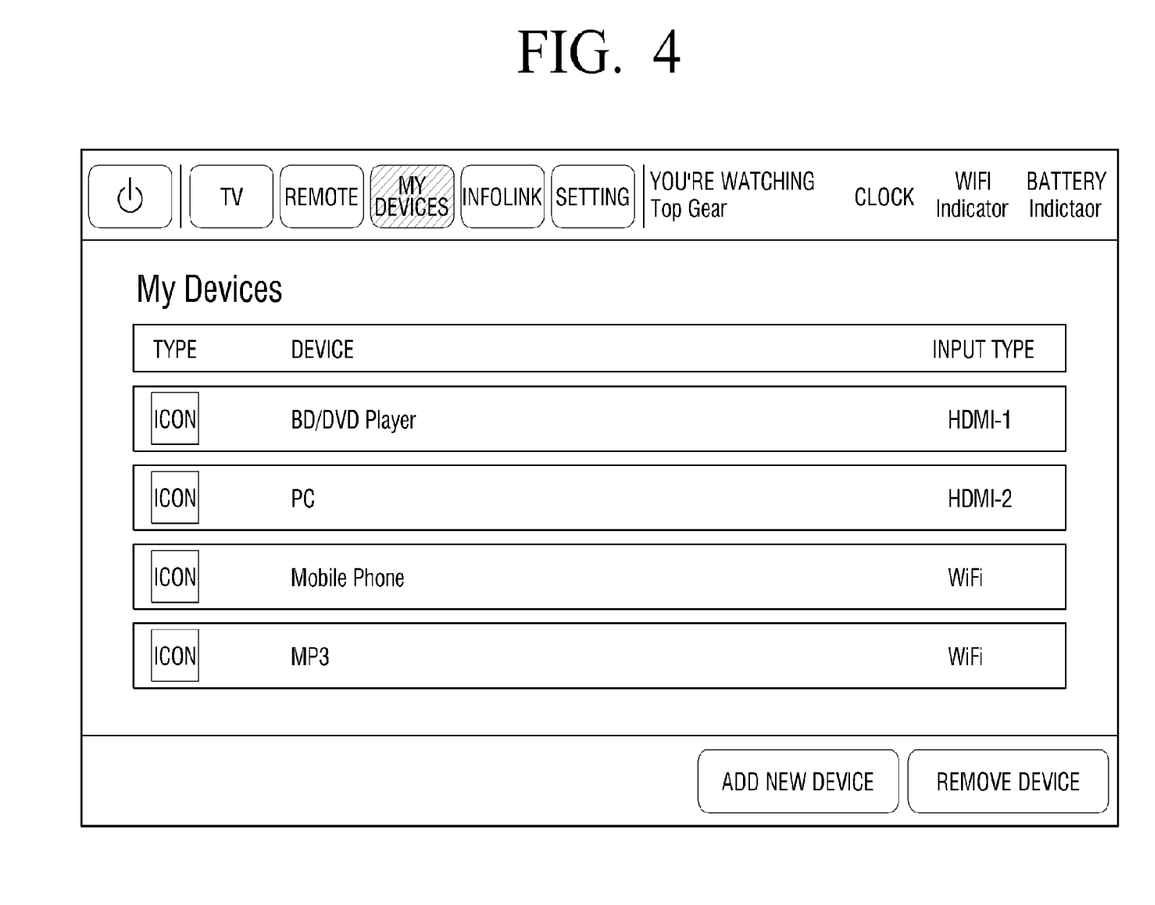
FIG. 4 to FIG. 7 are schematic views provided to additionally explain how to provide a GUI in FIG. 3.

FIG. 4 illustrates a GUI showing a list of external apparatuses. As illustrated in FIG. 4, the request for a list of external apparatuses in S320 can be input by manipulating a "My Device" icon on the upper part of the GUI.

Through the list of external apparatuses, a user may receive information regarding external apparatuses connected to the DTV 200 and select an external apparatus that he or she wants.

If a user selects an external apparatus among the external apparatuses in the list (S340-Y), the control unit 150 determines whether the number of GUIs for the selected external apparatus is more than two (S350).

If it is determined that the number of GUIs for the external apparatus selected in S350 is one (S350-N), the control unit 150 controls the GUI generation unit 130 so that the GUI can be displayed on the touch LCD 140 (S370).

Figure 5:
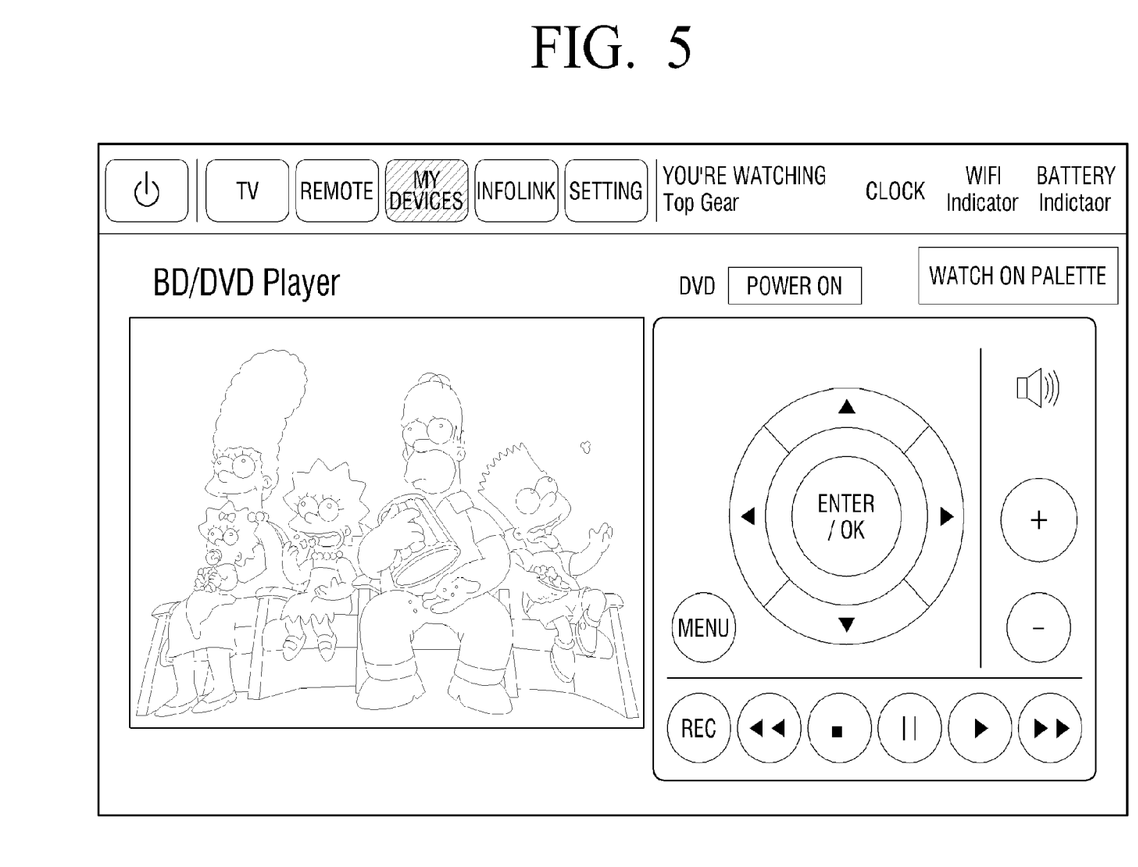

FIG. 5 illustrates a GUI displayed on the touch LCD 140 when 'the BD/DVD player 40, which is an external apparatus having a single GUI, is selected' in S340.

In the GUI, a remote controller having manipulation buttons to manipulate the BD/DVD player 40 is graphically illustrated. A user may touch the manipulation buttons on the GUI of the touch LCD 140 to input a command for the BD/DVD player 40.

If a command is input by a user, the control unit 150 controls the communication unit 110 so that the command can be transmitted to the BD/DVD player 40 through the DTV 200.

If the number of GUIs for the external apparatus selected in S350 is determined to be more than two (S350-Y), the control unit 150 determines a GUI to be displayed based on connection method between the selected external apparatus and the DTV 200 (S360). The control unit 150 controls the GUI generation unit 130 so that the GUI determined in S360 can be displayed on the touch LCD 140 (S370).

As explained above, the PC 60 can be connected to the DTV 200 via HDMI or LAN. Different GUIs are provided in S370 depending on connection method between the PC 60 and the DTV 200 since the PC 60 operates in a different operation mode depending on connection method between the PC 60 and the DTV 200.

Figure 6:
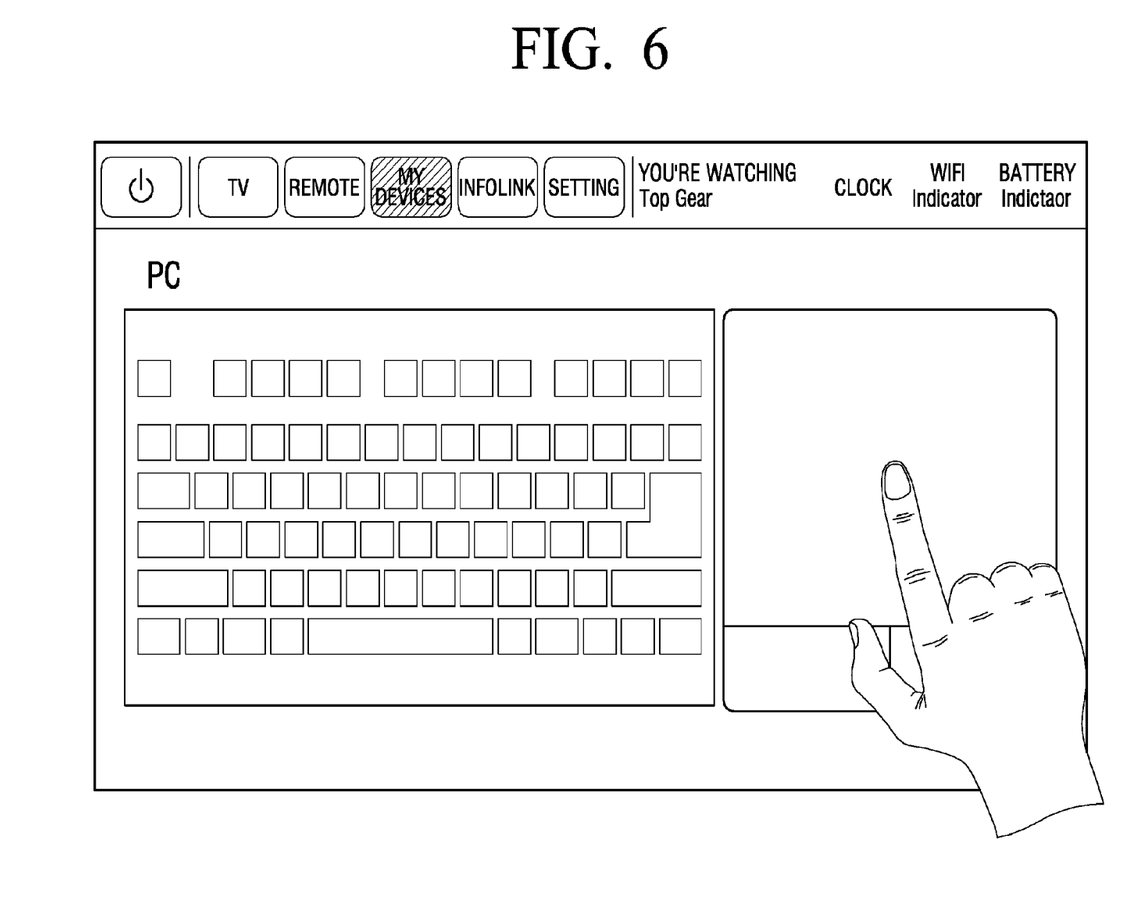

More specifically, if the PC 60 is connected to the DTV 200 via HDMI, a GUI is determined in S360 and provided in S370 as illustrated in FIG. 6. If the PC 60 is connected to the DTV 200 via LAN, a GUI is determined in S360 and provided in S370 as illustrated in FIG. 7.

In the GUI in FIG. 6, a keyboard of the PC 60 is graphically illustrated on the left and a touch pad for moving a pointer is graphically illustrated on the right.

Connecting the PC 60 to the DTV 200 via HDMI means that a user wants to use the DTV 200 as a monitor of the PC 60, and thus a GUI in which a remote controller 100 is functioned as an input means for the PC 60 is provided.

Figure 7:
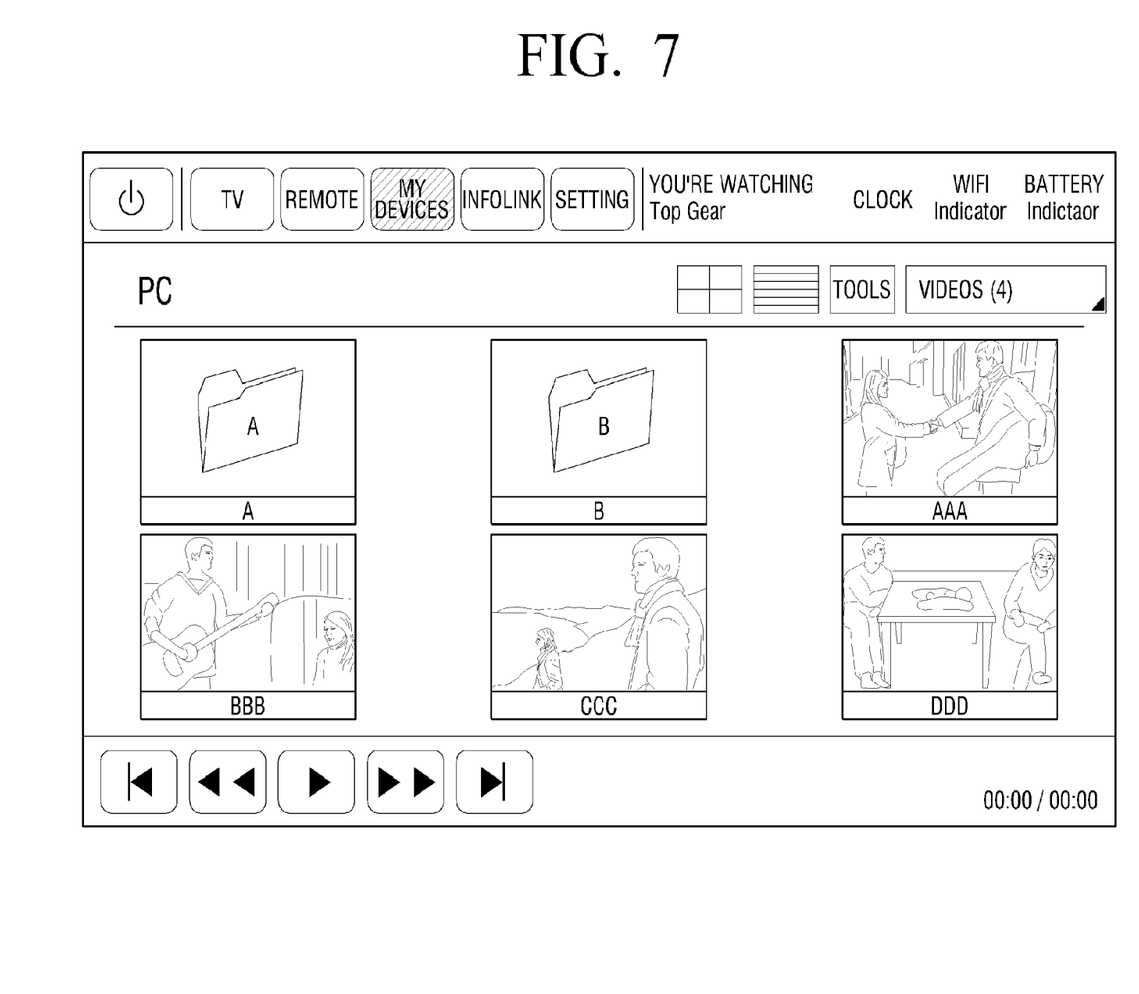

In the GUI in FIG. 7, a file browser for browsing files stored in the PC 60 is graphically illustrated.

Connecting the PC 60 to the DTV 200 via LAN means that a user wants to reproduce content files stored in the PC 60 via the DTV 200, and thus a GUI in which a remote controller 100 selects and reproduces a content file among content files stored in the PC 60 is provided.

Even if there are two kinds of connection methods, if an external apparatus has a single GUI, S360 cannot be applied since S370 is directly performed from S350 along with the N-path. Examples of such an external apparatus include the STB 40.

According to the above explanation, the STB 40 is connected to the DTV 200 in either component connection method or HDMI connection method since GUI is only one.

On the other hand, there are some external apparatuses which have usually one GUI, but have two GUIs to provide after an event occurs. For instance, a mobile phone 30 usually has one GUI, but if an event, such as receiving a SMS message, occurs, another GUI is generated to inform this, and therefore two GUIs are provided.

If an event, such as receiving a SMS message, occurs on the mobile phone 30, a user identifies the SMS message received on the mobile phone 30 via the remote controller 100. This will be explained in detail with reference to FIG. 8.

Figure 8:
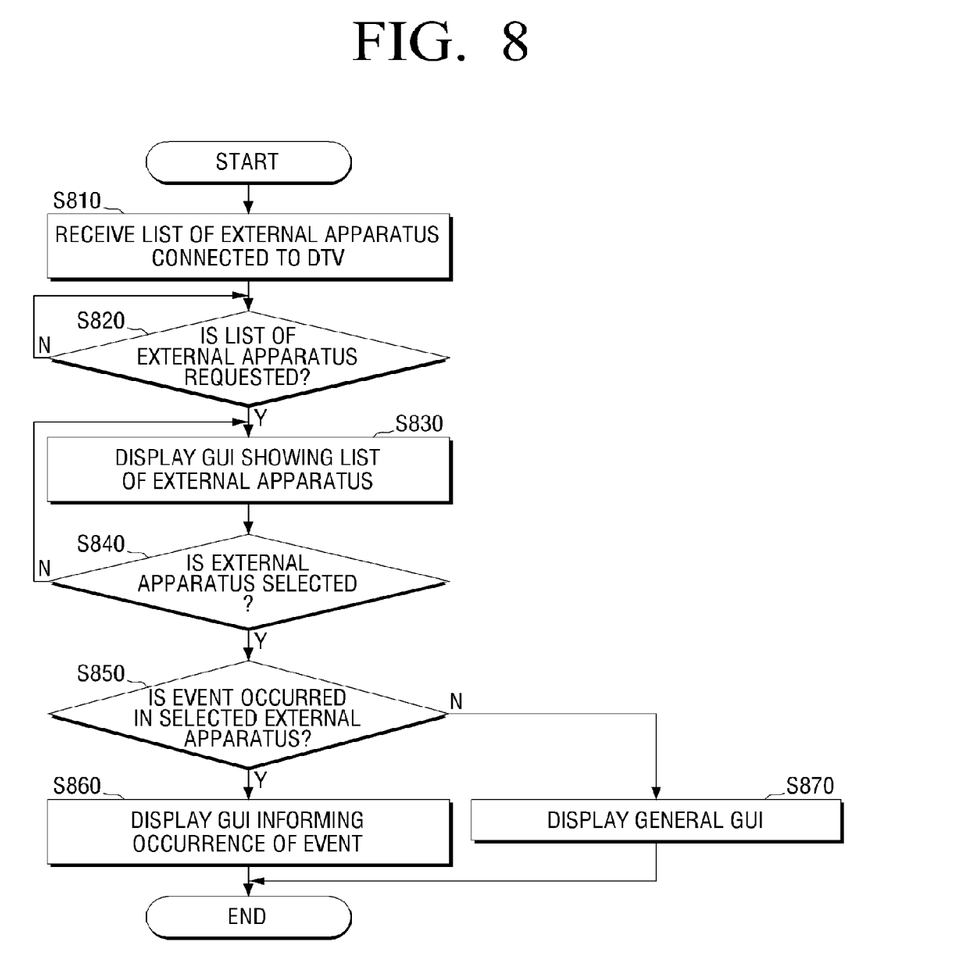
FIG. 8 is a flow chart provided to explain how to provide a GUI according to another exemplary embodiment of the present invention.

As illustrated in FIG. 8, the control unit 150 receives a list of external apparatuses from the DTV 200 via the communication unit 110 (S810). S810 is performed periodically.

The list of external apparatuses is a list of external apparatuses connected to the DTV 200, and includes information regarding the connected external apparatuses. The information regarding the external apparatuses includes information regarding whether an event has occurred.

If a user requests a list of external apparatuses via the touch LCD 140 (S820-Y), the control unit 150 controls the GUI generation unit 130 so that the GUI with the list of external apparatuses can be displayed on the touch LCD 140 (S830).

If a user selects one external apparatus among the external apparatuses on the list (S840-Y), the control unit 150 determines whether an event occurs in the selected external apparatus (S850).

Whether an event occurs or not can be determined in S850 based on information regarding external apparatuses included in the list of external apparatuses received in S810.

If it is determined that an event is occurred in the external apparatus in S850 (S850-Y), the control unit 150 controls the GUI generation unit 130 so that an GUI informing occurrence of an event can be displayed on the touch LCD 140.

If it is determined that an event is not occurred in the external apparatus (S850-N), the control unit 150 controls the GUI generation unit 130 so that a general GUI can be displayed on the touch LCD 140.

Figure 9:
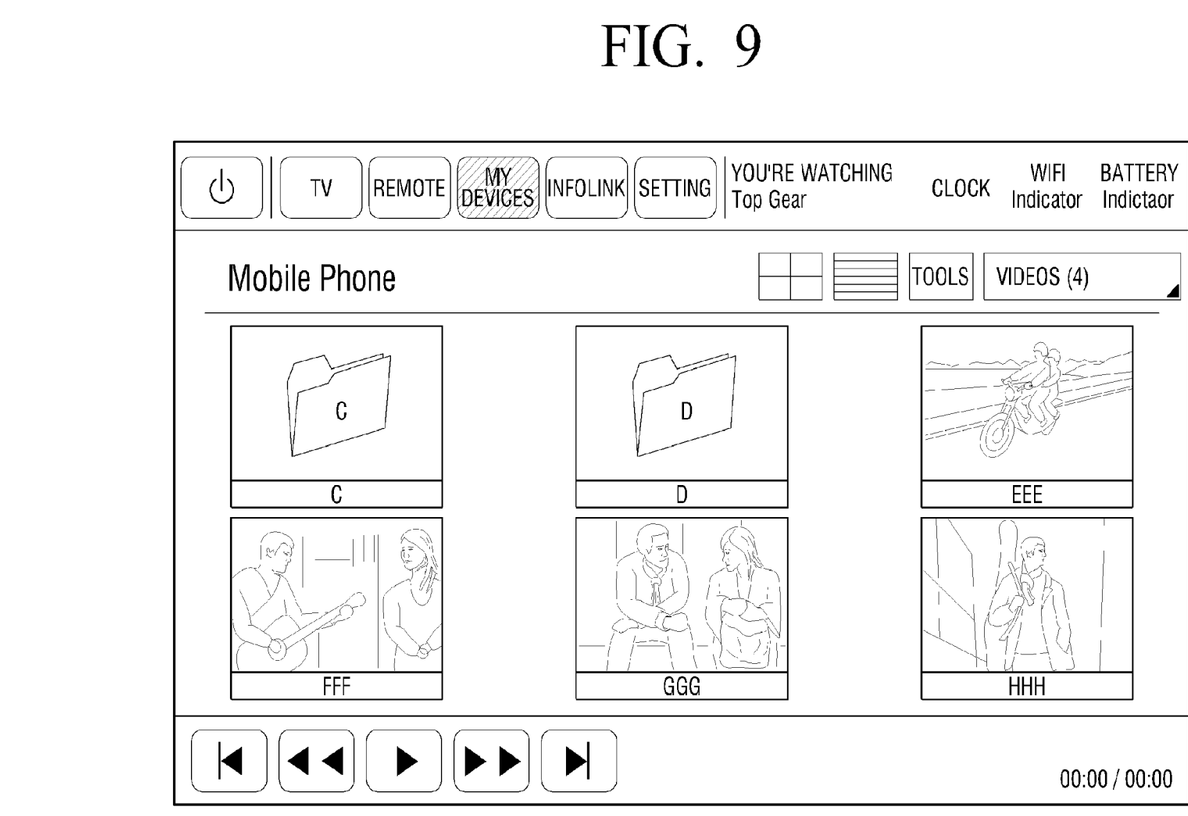
FIG. 9 to FIG. 10 are schematic vies provided to additionally explain how to provide a GUI in FIG. 8.
Figure 10:
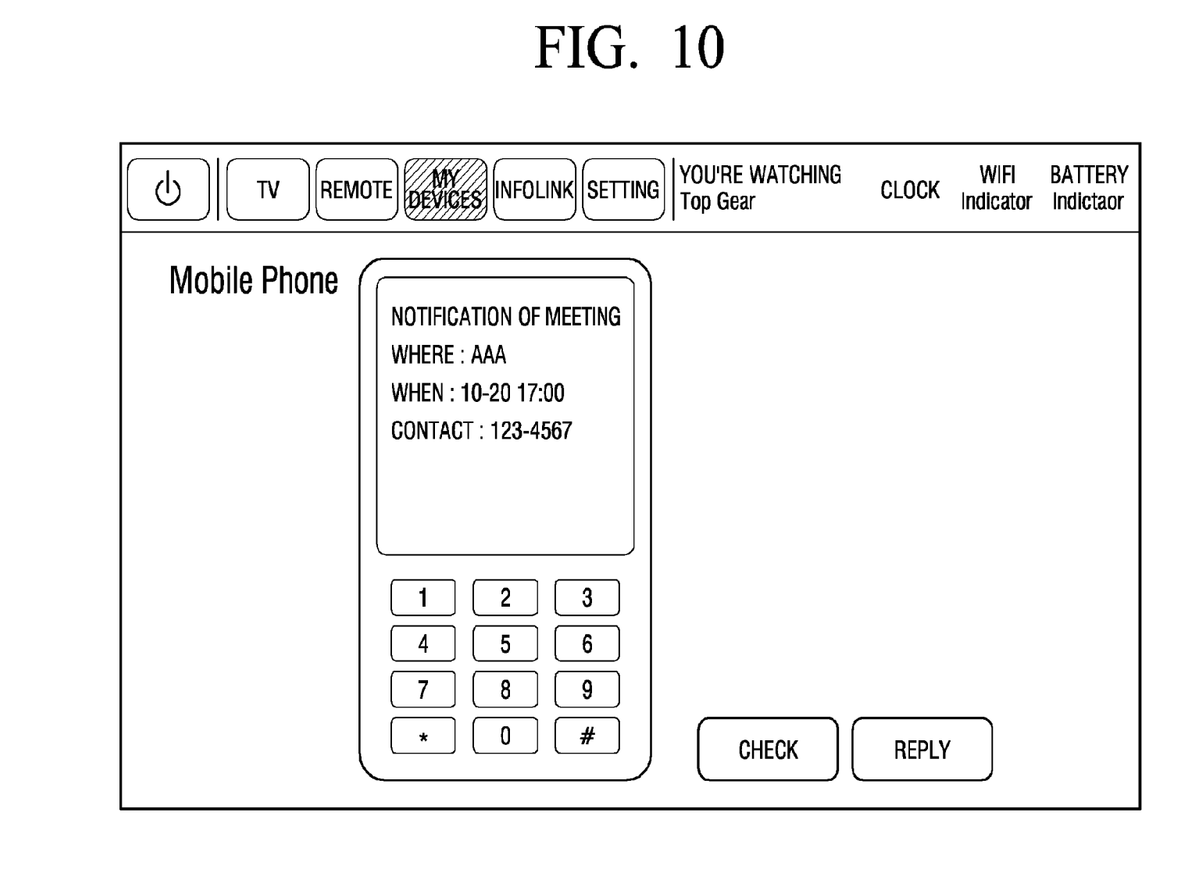

FIG. 9 illustrates a general GUI which is provided via S870 when an event of receiving a SMS message is not occurred in the mobile phone 30. FIG. 10 illustrates a GUI which is provided via S860 when an event of receiving a SMS message is occurred in the mobile phone 30.

If a user hears a ring tone to indicate an incoming SMS message from the mobile phone 30, the user may read the SMS message received in the mobile phone 30 via the remote controller 100 without directly checking the mobile phone 30.

The only manipulation required to read the SMS message is to select the mobile phone 30 in the GUI showing a list of external apparatuses provided via a remote controller 100. There is no need to search a sub-menu to check the SMS message.

That is because a GUI for checking the SMS message can be provided via a remote controller 100 only by selecting the mobile phone 30 in the GUI showing a list of external apparatuses.

If an event occurs in the mobile phone 30 while a general GUI is provided, the GUI may be interrupted to automatically provide a GUI for checking a SMS message.

The process of automatically selecting the most suitable GUI from among GUIs of external apparatuses based on connection method of external apparatuses connected to the DTV 200 or whether an event occurs has been described in detail with examples.

There are some external apparatuses for which a user has to select a GUI. For instance, some external apparatuses have more than two GUIs which are provided regardless of connection method with the DTV 200.

Examples of such external apparatuses include a MP3 player 20. The MP3 player 20 has two GUIs, 'a GUI for playing MP3' and 'a GUI for browsing files', whether it is connected to the DTV 200 via Bluetooth or WiFi.

If the DTV 200 is connected using Bluetooth, the MP3 player 20 can be operated in both "MP3 play" mode and "storage" mode. Even if the DTV 200 is connected using WiFi, the MP3 player 20 can be operated in both "MP3 play" mode and "storage" mode.

Figure 11:
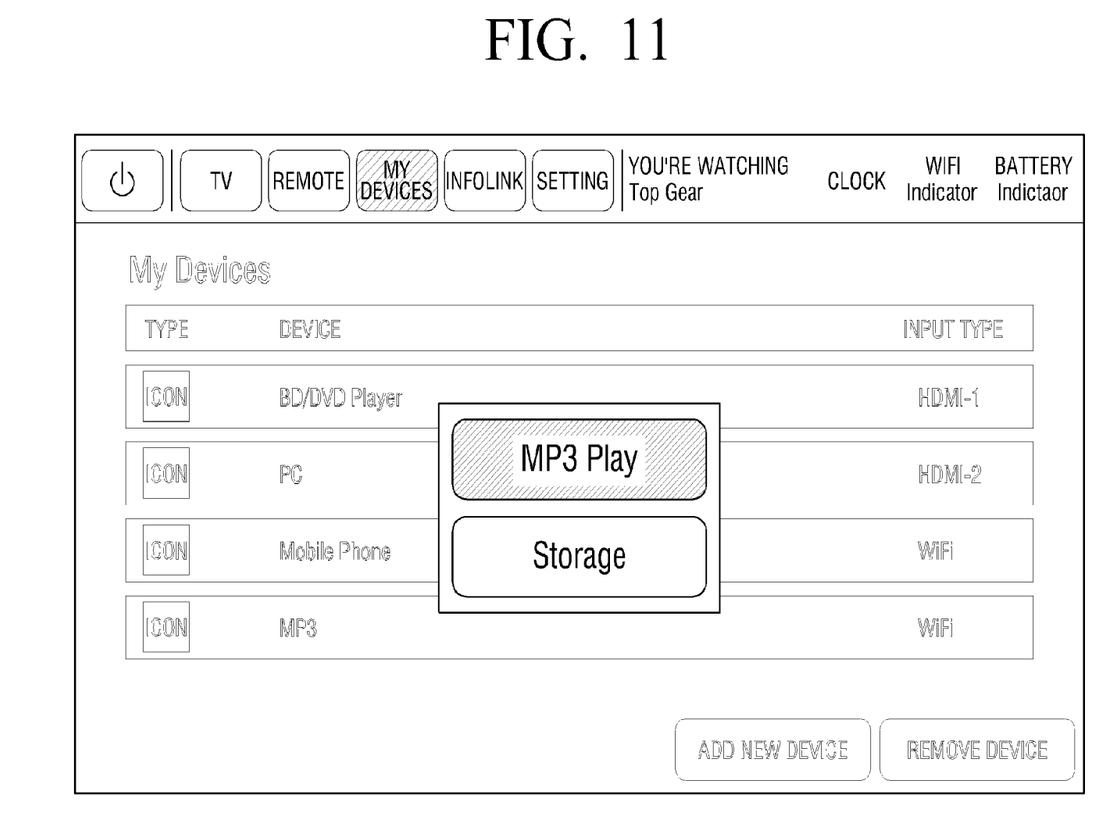
FIG. 11 is a schematic view provided to explained another exemplary embodiment of the present invention.

If a user selects "MP3" in the GUI showing the list of external apparatuses in FIG. 4, a GUI is provided as illustrated in FIG. 11. The GUI illustrated in FIG. 3 asks a user in which mode the user wants to operate the MP3 player 20, between "MP3 play" mode and "storage" mode, and help the user select a mode he or she wants.

If "MP3 play" is selected, a GUI for operating the MP3 player 20 in "MP3 play" mode is provided, which is similar to the GUI illustrated in FIG. 5.

If "storage" is selected, a GUI for operating the MP3 player 20 in "storage" mode is provided, which is similar to the GUI illustrated in FIG. 7.

The process of selecting a GUI when a user needs to select a GUI among GUIs of external apparatuses has been explained above with an exemplary embodiment.

However, the above process is only an example and a GUI can be selected in other ways. For instance, a recently operated mode can be analyzed among operation modes of an external apparatus, and a GUI which is used in the analyzed operation mode can be automatically selected, or a most frequently used operation mode can be analyzed and a GUI which is used in the analyzed operation mode can be automatically selected.

The process of selecting a GUI from among GUIs provided by an external apparatus based on connection method between the DTV 200 and external apparatuses, whether an event is occurred, a user's selection, and a past record (a recent operation mode, the frequency of usage) has been explained in detail with exemplary embodiments.

The DTV 200 can be replaced with other video apparatuses and other external apparatuses in the above description can also be replaced with other kinds of external apparatuses.

In the above examples, the remote controller 100 provides a user with a GUI of an external apparatus, but the DTV 200 can also provide a GUI of an external apparatus.

Figure 12:
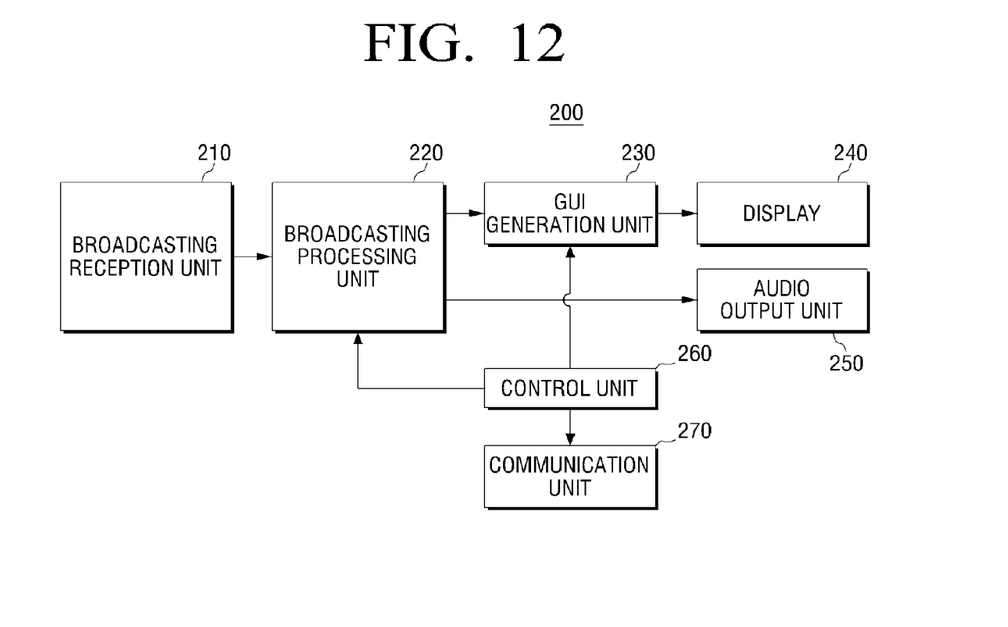
FIG. 12 is a detailed block diagram illustrating a DTV according to another exemplary embodiment of the present invention.

A detailed block diagram of the DTV 200 is illustrated in FIG. 12. As illustrated in FIG. 12, the DTV 200 comprises a broadcasting receiving unit 210, a broadcasting processing unit 220, a GUI generation unit 230, a display 240, an audio output unit 250, a control unit 260, and a communication unit 270.

The broadcasting receiving unit 210 receives a program from a broadcasting station or a satellite with wire or wirelessly and demodulates it.

The broadcasting processing unit 220 performs signal processing such as video decoding, video scaling, audio decoding on a program output from the broadcasting receiving unit 210. The broadcasting processing unit 220 transmits a video signal to the GUI generation unit 230 and transmits an audio signal to the audio output unit 250.

The GUI generation unit 230 generates a GUI to be displayed on the display 240, and adds the generated GUI to video output from the broadcasting processing unit 220. The process of generating a GUI by the GUI generation unit 230 is controlled by the control unit 260 which will be explained later.

The display 240 displays video to which the GUI output from the GUI generation unit 230 is added. The audio output unit 250 outputs audio output from the broadcasting processing unit 220 via a speaker.

The control unit 260 controls overall operation of the DTV 200 according to a user's command transmitted from the remote controller 100 via the communication unit 270. If a user's command transmitted from the remote controller 100 via the communication unit 270 is a command related to an external apparatus, the control unit 260 transmits the command to the relevant external apparatus via the communication unit 270.

The control unit 260 controls the GUI generation unit 230 according to an algorithm illustrated in FIG. 3 or FIG. 8 so that a GUI of the selected external apparatus can be displayed on the display 240.

If an algorithm illustrated in FIG. 3 or FIG. 8 is performed by the control unit 260, S310 in FIG. 3 and S810 in FIG. 8 may not be performed.

In the above example, an algorithm illustrated in FIG. 3 or FIG. 8 is performed only by the remote controller 100 or the DTV 200, but this is only an example and it can be performed in other ways.

For instance, a part of process constituting an algorithm illustrated in FIG. 3 or FIG. 8 can be performed by the remote controller 100, and the rest of the process can be performed by the DTV 200 so that the remote controller 100 and the DTV 200 can share the role of providing a GUI of an external apparatus.

In the above description, a GUI of an external apparatus which is selected from a list of external apparatuses is provided, but this is only an example. The DTV 200 can be included in the list in addition to external apparatuses, and if the DTV 200 is selected, a GUI of the DTV 200 can be provided to a user.

In the above example, the remote controller 100 is connected to the external apparatuses 10 to 80 via the DTV 200, but this is only an example. The remote controller 100 can be directly connected to external apparatuses 10 to 80, and they can be connected both with wire and wirelessly.

The remote controller 100 can directly transmit a user's command to the external apparatuses 10 to 80, and receive contents directly from the external apparatuses 10 to 80 and reproduce them. In addition, the remote controller 100 can receive a GUI directly from the external apparatuses 10 to 80.

In this case, the remote controller 100 provides a GUI for an external apparatus selected by a user. For instance, if the remote controller 100 is directly connected to the PC 60 wirelessly and a user selects the PC 60 via a list of external apparatuses, the remote controller 100 may provide a user with a GUI displaying a file browser for browsing files stored in the PC 60 as illustrated in FIG. 7.

The remote controller 100 may be connected via the DTV 200 while being directly connected to a certain external apparatus.

The foregoing exemplary embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A broadcasting signal processing apparatus, comprising:
   a display;
   a tuner which processes broadcasting signal;
   a first communication circuitry which communicates with a first external device through a wired communication;
   a second communication circuitry which communicates with a second external device through a wireless communication; and
   a processor which controls the second communication circuitry to transmit, to the second external device, a device type of the first external device and an interface type of the wired communication, which is a type of connection method with the first external device, and in response to control information for controlling the first external device being received from the second external device through the wireless communication, to control the first communication circuitry to transmit to the first external device, control command based on the control information received from the second external device,
   wherein the interface type of the wired communication comprises at least one of an HDMI connection and a component connection.

2. The apparatus as claimed in claim 1, wherein the device type of the first external device comprises at least one of an optical player, a personal computer (PC), and an MP3 player.

3. The apparatus as claimed in claim 1, wherein the processor controls the display to display GUI for controlling the first external device based on commands received from the second external device.

4. A method of controlling a broadcasting signal processing apparatus, comprising:
   processing a broadcasting signal;

transmitting, to a second external device through a wireless communication, a device type of a first external device which is connected with the broadcasting signal processing apparatus through the wired communication, and an interface type of the wired communication which is a type of connection method between the broadcasting signal processing apparatus and the first external device; and in response to control information for controlling the first external device being received from the second external device through a wireless communication, transmitting control command based on the received control information to the first external device through a wired communication, wherein the interface type of the wired communication comprises at least one of an HDMI connection and a component connection.

5. The method as claimed in claim 4, wherein the second external device is a remote controller.

6. The method as claimed in claim 4, further comprising automatically determining one of a plurality of GUIs of the first external device based on a predetermined criteria which comprises an occurrence of an event in the first external device.

7. The method as claimed in claim 4, further comprising automatically determining one of a plurality of GUIs of the first external device based on a predetermined criteria which is one of a receipt of a message and an operating mode of a plurality of operating modes of the first external device.

8. The method as claimed in claim 4, wherein the device type of the first external device comprises at least one of an optical player, a person computer (PC), and an MP3 player, and wherein the interface type comprises at least two of the HDMI, a composite video connection, and the component video connection.

9. The method as claimed in claim 4, wherein the interface type, which is the type of connection method between the first external device and the broadcast signaling processing apparatus, is transmitted to the second external device to be displayed by the second external device and is selected from a plurality of wired connection types comprising the HDMI connection and the component connection.

* * * * *